United States Patent
Trift et al.

(10) Patent No.: US 8,086,177 B2
(45) Date of Patent: Dec. 27, 2011

(54) COMMUNICATION DEVICE FOR A LANDBORNE VEHICLE

(75) Inventors: Jérôme Trift, St. Cloud (FR); François-Gaël Ottogalli, Challes les Eaux (FR); Yves Thorigne, Verson (FR)

(73) Assignee: Orange France, Montrouge (FR)

( * ) Notice: Subject to any disclaimer, the term of this patent is extended or adjusted under 35 U.S.C. 154(b) by 1253 days.

(21) Appl. No.: 10/554,943

(22) PCT Filed: Apr. 29, 2004

(86) PCT No.: PCT/FR2004/050176
§ 371 (c)(1),
(2), (4) Date: Dec. 28, 2006

(87) PCT Pub. No.: WO2004/100465
PCT Pub. Date: Nov. 18, 2004

(65) Prior Publication Data
US 2007/0110008 A1 May 17, 2007

(30) Foreign Application Priority Data
Apr. 30, 2003 (FR) ..................... 03 05382

(51) Int. Cl.
*H04B 7/00* (2006.01)
(52) U.S. Cl. ............. 455/41.2; 455/41.1; 455/41.3; 455/450; 370/401; 709/249
(58) Field of Classification Search ........ 455/41.1–41.3, 455/418–420; 370/401, 466, 467; 709/249, 709/250, 227–244, 208
See application file for complete search history.

(56) References Cited

U.S. PATENT DOCUMENTS

| | | | |
|---|---|---|---|
| 7,197,326 B2 * | 3/2007 | Acampora | 455/522 |
| 2002/0073240 A1 * | 6/2002 | Kokkinen et al. | 709/249 |
| 2003/0045275 A1 * | 3/2003 | McDonagh et al. | 455/414 |
| 2003/0058832 A1 * | 3/2003 | Knauerhase et al. | 370/349 |
| 2003/0157975 A1 * | 8/2003 | Kadel et al. | 455/575 |
| 2005/0281237 A1 * | 12/2005 | Heinonen et al. | 370/338 |

FOREIGN PATENT DOCUMENTS
EP   1 209 928 A   5/2002

OTHER PUBLICATIONS

Lind R. et al., "The Network Vehicle—A Glimpse Into the Future of Mobile Multi-Media", IEEE Aerospace and Electronic Systems Magazine, IEEE Inc., New York, US, vol. 14, No. 9, pp. 27-32, Sep. 1999.

* cited by examiner

*Primary Examiner* — Lester Kincaid
*Assistant Examiner* — Mehmood B Khan
(74) *Attorney, Agent, or Firm* — Cozen O'Connor

(57) ABSTRACT

A communications system for land vehicles usable in the field of radio communications with any electronic data processing equipment connected to a mobile telecommunications network. The communications system enables the connection of a communication terminal (TP_i) to a mobile communications network (2) from a vehicle (1) of the kind including a local network (PAN) linked to the vehicle, and a server for connecting said local network to the communications network (GPRS, UMTS). The local network (3) provides a resource (Cext) for connecting a requesting communications terminal (TP_k) and the mobile communications network (2), and resources (Cint) for setting up a connection between two mobile terminals (TP_i, TP_j) connected to the local network (PAN) linked to the vehicle.

21 Claims, 2 Drawing Sheets

COMMUNICATION DEVICE FOR A LANDBORNE VEHICLE

RELATED APPLICATIONS

This is a U.S. National Phase Application under 35 USC 371 of International Application PCT/FR2004/050176, filed on 29 Apr. 2004.

FIELD OF THE INVENTION

The present invention relates to a communications system for a land vehicle. It finds an application in the field of radio communications and makes it possible to use multimedia services normally accessible by any electronic data processing equipment connected to a mobile telecommunications network, while on board a land vehicle such as a motor vehicle.

In the context of the invention, a plurality of persons in a vehicle can access various communications services via the Internet. These users in the vehicle use their personal electronic data processing terminals to access multimedia services. In a first embodiment, the access mode is GSM/GPRS telephony mode in particular. In a second embodiment, the access mode is UMTS telephony mode or any other telephony mode for mobiles enabling the invention to be implemented.

In the context of the invention, an electronic data processing terminal is connected to the mobile network via a personal wireless network using the Bluetooth™ or WiFi™ protocol, for example. The application field is therefore that of data and the access mode is the packet mode. However, this invention is not limited to data services, because the system for connecting the local network to the mobile network can also provide a telephone service, provided that the service is based on the Voice over IP (VoIP) technique.

In the context of the invention, two techniques co-operate to achieve these objectives:
firstly, the access network (GPRS, UMTS . . . ), which operates in packet mode,
secondly, the short-range communications technology, such as the Bluetooth™ technology for example, so that it is possible to interconnect a plurality of terminals and more particularly at most N−1 terminals connected to an $N^{th}$ terminal that serves as the system for connecting a local network of N local stations to the mobile network.

BACKGROUND OF THE INVENTION

The use of a piconet local network, such as a Bluetooth™ technology local network, associated with an access point to a network, whether fixed or mobile, is described in a number of prior art publications and has led to industrial implementation.

Access point products enabling access by electronic data processing terminals equipped with a Bluetooth™ interface to the high bit rate ADSL fixed network may be mentioned.

Systems for connecting a Bluetooth™ "piconet" local network to a mobile network via a mobile telephone may also be mentioned. A mobile telephone then serves as a gateway between the mobile network and the Bluetooth™ piconet local network.

The company IXI Mobile Inc. of Palo Alto, Calif. has more particularly developed a Personal Mobile Gateway (PMG) system enabling connection to a GSM/GPRS network of a plurality of electronic data processing terminals equipped with Bluetooth™ short-range communications interfaces. The architecture of that system is based on a small system (known as the PMG) which provides functions for connecting to the network via a GSM/GPRS radio module. That system is also equipped with a Bluetooth™ radio module. In addition to the functions mentioned above, the PMG also provides microrouter and microserver functions for GSM/GPRS radio connectivity and Bluetooth™ radio connectivity. In particular, the microserver provides functions for setting parameters of the piconetwork formed in this way by the various personal electronic data processing devices. These parameter setting functions concern in particular the devices that may be connected and the applications using the capacities of the system. The concept developed by IXI is therefore the opposite of the "all in one" terminal concept based on the possibility of a single terminal providing all the services that a mobile user requires.

There is also described in the prior art the implementation in a motor vehicle of a system offering services available via a UMTS mobile network. The bit rate available on the mobile connection is 128 kilobits per second (kbit/s) and the services that have been demonstrated include direct video, downloading of music tracks, videophony, and an offboard navigation system. The communications services offered may include those of the professional (business services), mobility, entertainment, and information fields. All of those services benefit from video support. In that experimental version, the vehicle is equipped with IBM-PC computers and display screens disposed in the seatbacks. Those devices are not interconnected by a short-range radio connection, for example of the Bluetooth™ type, but instead by a cable harness.

European Patent application EP-A2-1.209.928 discloses a system whose architecture is based on a server (preferably of the PC type). That server is installed in a vehicle, preferably a rail car, and is equipped with two types of radio interface, the first of which is preferably of the W-CDMA (UMTS) type, in order to access remote servers, while the second is a short-range radio interface (preferably of the Bluetooth™ type). The system is completed by a service controller server responsible for controlling access to the resources of the first server. The system described is for public use only and the terminals with access to the first server or to the remote servers, which are preferably mobile telephones, belong to members of the general public.

Consequently, the above system is not based on the use of multimedia services available to a personal network via a packet mode mobile network (such as a GPRS network); to the contrary, such access is made available to the "general public". To this end, upon activation of each session, the terminal in use must in particular use an "access controller" system to carry out a security procedure including an identification step followed by an authentication step.

An analysis of the prior art indicates the following problems:
The association of a set of personal electronic data processing devices forming a personal network and a mode of access to a packet (GPRS) mobile network is described but there is no disclosure as to any form of use in the motor vehicle field. The access point to the mobile telephone network is itself a portable element and the prior art proposes that it be integrated into a mobile telephone.
The application to data services provided in a vehicle offers services accessed via the UMTS network. The terminals on which the services are available are integrated into the vehicle and the local network is a static network.
The interaction between means giving radio access to the mobile network and a wireless local network is already known in the art. However, there is no personal network concept in the prior art, since the local network is inherently open to the general public. It is therefore necessary to carry out the various procedures for accessing this local network, which then provides access to the W-CDMA mobile network.

SUMMARY OF THE INVENTION

The present invention provides a remedy to the above problems of the prior art. It relates to a communications system for enabling connection of a communications terminal to a mobile communications network from a vehicle of the kind including a server for connecting to said mobile communications network. According to the invention the system comprises:
- a PAN local network linked to the vehicle and consisting of a mobile terminal of said vehicle and is provided with wireless connection means;
- means for providing a resource (Ctext) for connecting a requesting communications terminal to said mobile communications network;
- means for providing a resource (Cint) for interconnecting two mobile terminals connected to said local network linked to the vehicle without accessing said mobile communications network; and
- said connection server being configured to establish at least one connection (Cint) and at least one connection (Ctext) simultaneously.

Said local network includes means for providing a resource for connecting a requesting communications terminal and the mobile communications network and the communications server includes resources for setting up a connection (Cint) between two mobile terminals (TP_i, TP_j) connected to the local network (PAN) linked to the vehicle and a connection (Cext) to the mobile communications network e.g.(GPRS).

DETAILED DESCRIPTION OF THE DRAWINGS

Figure 1:
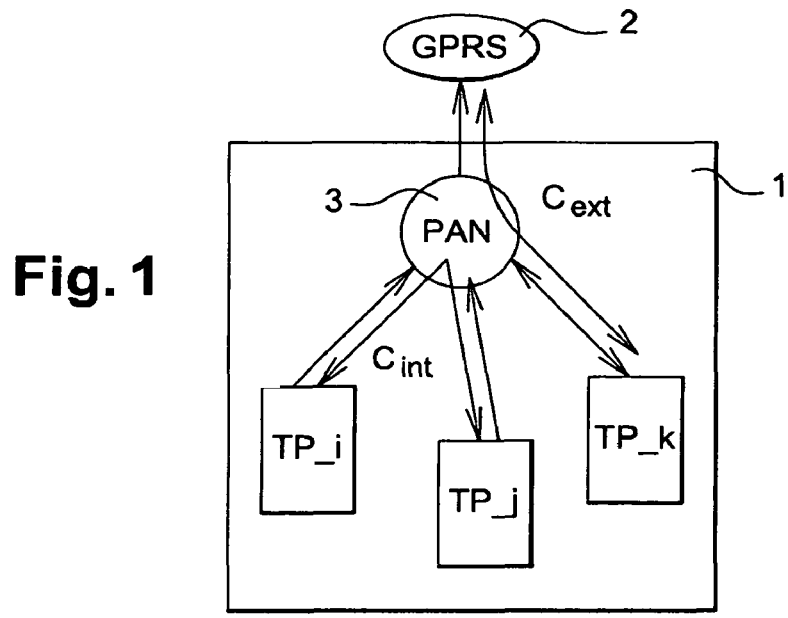
FIG. 1 is a block diagram of a system of the invention.

A first feature of the system of the invention is the use of a personal wireless network in a motor vehicle, this personal network consisting of various electronic data processing or telecommunications terminals such as a personal computer (PC), personal digital assistant (PDA), MP3 music player, mobile telephone, tablet computer, etc.

These electronic data processing terminals are preferably portable, i.e. are not attached in any manner whatsoever to the motor vehicle. They are connected to a personal area network (PAN) via a contactless communications interface, such as an IrDa infrared interface or a Bluetooth radio interference.

However, the system of the invention is not limited to portable terminals. It may include service access terminals integrated into the vehicle, whether they are connected to the PAN by wireless connection means (which is preferable), such as an IrDa infrared interface or a Bluetooth radio interface, or by cables, as explained below in the description.

A second feature of the system of the invention is the connection of the PAN to a mobile telephone network (for example of the GPRS or UMTS type). This connection is provided by a radio module providing an interface to the mobile network. In the remainder of the document the common point between the mobile network and the PAN is referred to as the system for connecting the local network to the mobile network. This system for connecting the local network to the mobile network provides routing functions enabling connection of any terminal belonging to the PAN to an application server accessed via the mobile network.

The invention therefore offers a system capable of simultaneously connecting at most a particular number of terminals, such as a group of at most seven terminals in a Bluetooth™ piconet, whilst delivering multimedia services to application servers that are accessed via the mobile network. The applications accessed are not mutually dependent in any way. Also, for example, the terminals access services having data content, such as text, graphic, sound or video data, and/or electronic data processing program content, such as an ASP application, a forms service, etc.

According to one essential aspect of the invention, access to different contents is effected simultaneously by the system for connecting the local network to the mobile network. Mention can be made of access to the worldwide web (WWW), service portals such as an Orange portal, entertainment services, traffic information services, videophone services. This list is given by way of example and is in no way limiting on the invention.

A third feature of the system of the invention is that it includes means whereby two electronic data processing terminals are able to communicate with each other using the resources of the system for connecting the local network to the mobile network. In this case, the system includes means for providing routing functions within the PAN without accessing the mobile communications network.

FIG. 1 shows one embodiment of a system of the invention implemented in a vehicle 1.

The vehicle 1 may consist of a motor vehicle, a rail car, the passenger compartment of a bus or a coach, or a mobile home.

By way of example, the mobile communications network 2 may be a GPRS or UMTS network. It may be used to access electronic data processing resources or information or data contents.

Inside the vehicle 1, there is a local network 3 that is provided with means for connecting it to the mobile communications networks 2 and with means for its wireless connection to a plurality of terminals TP_i, TP_j, TP_k.

The system of the invention includes control means for the local network 3, consisting of:
- means for connecting a terminal TP_k to the mobile communications network 2 via an external communications resource Cext;
- means for connecting two or more terminals TP_i and TP_k to each other via the local network 3 without having to connect to the mobile communications network 2.

In one particular embodiment, the invention is based on the association of three elements.

The first element consists of the personal area network (PAN) as such. In one particular embodiment, the PAN uses means defined in the Bluetooth technology for example. The profile used is the PAN profile defined by the Bluetooth™ SIG (which is the organization that produces the Bluetooth™ specifications) and is managed on the system of the invention by PAN profile management means. The various electronic data processing terminals have the PAN User (PANU) function and the system for connecting the local network to the mobile network has the network access point (NAP) function. The network access point, which here is implemented in the system for connecting the local network to the mobile network, must be set to multi-user mode. In this case, the network access point cooperates with means for configuring it as the Bluetooth™ piconet master and the various terminals TP_i as piconet slaves.

In one particular embodiment, the system for connecting the local network to the mobile network is constructed on an Ipaq™ (Hewlett-Packard personal digital assistant (PDA)) platform. The operating system is the "Familiar" version of Linux.

In one particular embodiment, in order to offer an economical solution, the system for connecting the local network to the mobile network is implemented in an electronic component (integrated circuit, such as a PLD integrated circuit).

The second element of the invention uses the communications interface to the mobile (preferably GPRS) network. It comprises a hardware portion and a software portion.

Figure 2:
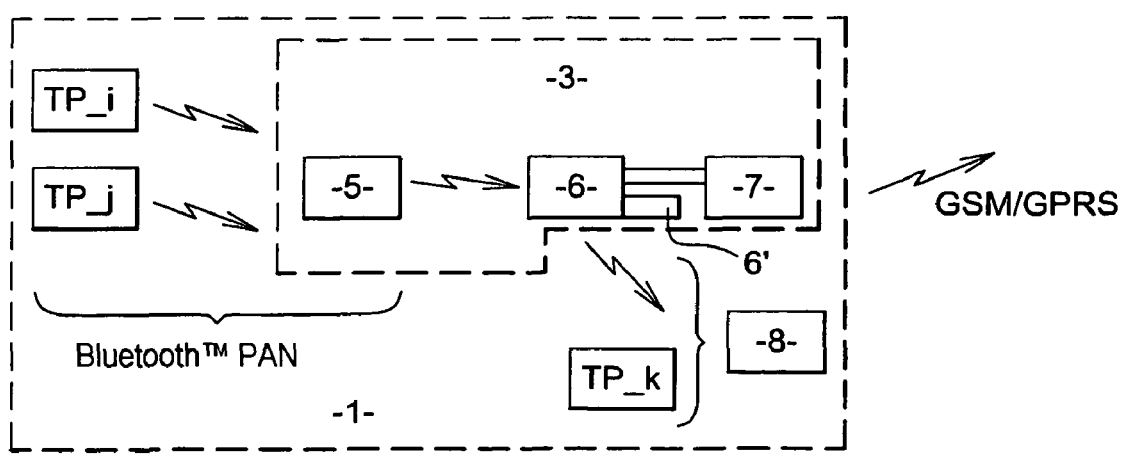
FIG. 2 is a block diagram of one particular embodiment of a system of the invention.

The hardware portion, shown diagrammatically in FIG. 2, in which elements that are common to FIG. 1 are not described further, is implemented by means for implementing a communications interface to the mobile telephone network.

In one embodiment, the means for implementing a communications interface to the mobile telephone network include three elements:
  the system 5 for connecting the local network to the mobile network, already defined,
  a WIreless Standard MOdule (WISMO) type GSM/GPRS modem 7, for example, which cooperates with means for producing and executing a standard AT Commands protocol and conforms to the specifications of the ETSI GSM 07/07 standard; in one particular embodiment, the modem cooperates with SIM card management means 6',8,
  a handsfree system 6 for connection to the GSM/GPRS network, adapted to be installed in the vehicle. In the case of a motor vehicle, this handsfree system for connection to the GSM/GPRS network is an appropriate unit available off the shelf, such as the CK 4000 from Parrot. This third element 6 is disposed between the system 5 for connecting the local network to the mobile network and the modem 7, as shown in FIG. 2.

In one particular embodiment, the SIM card management means are not physically connected to the WISMO modem and the SIM cards are electrically emulated by electrical connections provided by the third element of the invention. The SIM card (or the USIM card for a UMTS network or any other mobile terminal UICC card) is present in a mobile telephone connected to the third element of the invention via the Bluetooth™ link. This enables the exchange between the WISMO type modem and the SIM card of the mobile telephone of messages conforming to the ETSI/GSM 07/11 specifications. Note that this embodiment is not specific to the invention, because the function implementing the system for connecting the local network to the mobile network is in no way dependent on the SIM card access mode. In a different embodiment, the modem 6 has a SIM card (or a USIM card for a UMTS network or any other mobile terminal UICC card) physically inserted into an appropriate connector (not shown) connected to the modem by an electronic circuit.

The software portion is implemented in the form of programs executed mainly by the system for connecting the local network to the mobile network. It is organized around the following functions:

1. The system 5 for connecting the local network to the mobile network executes the essential function of the invention. At the functional level, the system 5 for connecting the local network to the mobile network includes means for executing the following functions:
  PAN local network constitution;
  routing messages between each terminal and the application server accessed by said terminal via the mobile network;
  GSM/GPRS Connection;
  inter-PAN routing, i.e. routing between two service access terminals (with no connection to the GSM/GPRS connection).

To provide the above four functions, the system 5 for connecting the local network to the mobile network includes software means for implementing the following functions:
  IP Network Address Translation (NAT); this function translates IP address assigned to the system for connecting the local network to the mobile network on the PAN side and the IP address assigned by the mobile network upon activation of the PDP context (PDP ADDRESS); accordingly, the system 5 for connecting the local network to the mobile network has two IP addresses, one of which is assigned by the GPRS network and the second of which is assigned statically or dynamically when the PAN is put together; accordingly, the only address visible from the outside (for example to application servers) is the first address (PDP ADDRESS);
  IP routing; this function routes IP packets to their destination addresses;
  Ethernet bridge; this function provides a bridge between the various terminals constituting the PAN, the medium access control (MAC) address used being the Bluetooth™ address; this address is contained in the header of messages of the Bluetooth™ Network Encapsulation Protocol (BNEP) layer;
  firewall for protecting the PAN from external attack;
  activation of the connection to the GSM/GPRS network; this function activates and deactivates the connection to the GSM/GPRS network and consists of a set of AT commands that are sent to the GSM/GPRS modem; in addition to activation/deactivation of the connection to the network, these commands are used to configure various parameters of that connection; activation of a GSM/GPRS connection, which is under the control of the system 5 for connecting the local network to the mobile network, is triggered in three modes:
  automatically by one of the electronic data processing terminals belonging to the PAN upon accessing a remote service;
  at the request of one of the access terminals;
  upon initializing the system for connecting the local network to the mobile network, in which case the objective is to maintain the connection active until it is stopped or reinitialized;
  dynamic Internet connection IP address assignment; this function for assigning IP addresses within the network PAN may be executed dynamically by a Dynamic Host Configuration Protocol (DHCP) server hosted by the system for connecting the local network to the mobile network;
  static Internet connection IP address assignment; this function for assigning IP addresses within the network PAN may be executed statically by a command line entered manually at a user interface console which, depending on the embodiment, may be managed by a portable terminal TP_i, the system for connecting the local network to the mobile network, or the system 6 for the connection to the GSM/GPRS network.

The first solution constitutes a preferred embodiment in that it involves no user action. Within the PAN, each terminal has an IP address, including the system for connecting the local network to the mobile network. That address is attached to the interface pan0, as described below.

In the case of the present invention, the operating system of the system 5 for connecting the local network to the mobile network is Linux. The implementation of the functions of the system for connecting the local network to the mobile network is described below with reference to FIG. 3.

The system 5 for connecting the local network to the mobile network has a PAN demon (PANd) 9 whose function is to create a virtual network interface 11 for Ethernet communications with a client CL 0 to CL i.

Each client CL i is associated with a virtual interface bnepx. Once the Ethernet PAN has been set up, calls can be routed at the Ethernet level or at the IP level if an IP interface is associated with each virtual Ethernet interface.

Ethernet routing is effected by an Ethernet bridge 11 which in one embodiment is a 802.1d Ethernet bridge included in the Linux 2.4.x kernel.

The Ethernet bridge 11 is initialized on the system 5 for connecting the local network to the mobile network serving as a network access point NAP. It creates a new virtual interface pan0 combining the interfaces bnepx created for each connected client.

Once this operation has been effected, clients can be addressed directly by the MAC address of the Bluetooth™ peripherals and the system 5 for connecting the local network to the mobile network can be addressed by the MAC address of its Bluetooth™ peripheral.

In the context of IP routing, an IP address is associated with each virtual Ethernet interface. This address is assigned either by an automatic mechanism, such as a DHCP mechanism, or statically. When the IP addresses have been assigned, the system 5 for connecting the local network to the mobile network becomes the gateway of the PAN, which enables it to route IP packets to the required destination (inside or external to the PAN).

To connect the clients to an external network, the system 5 for connecting the local network to the mobile network sets up a new ppp0/GPRS communications interface. It then uses IP NAT address translation and firewall functions in the Linux 2.4.x kernel that enable it to show only a single entity on the external network (which may be a GPRS network, for example) and to protect the clients.

Figure 3:
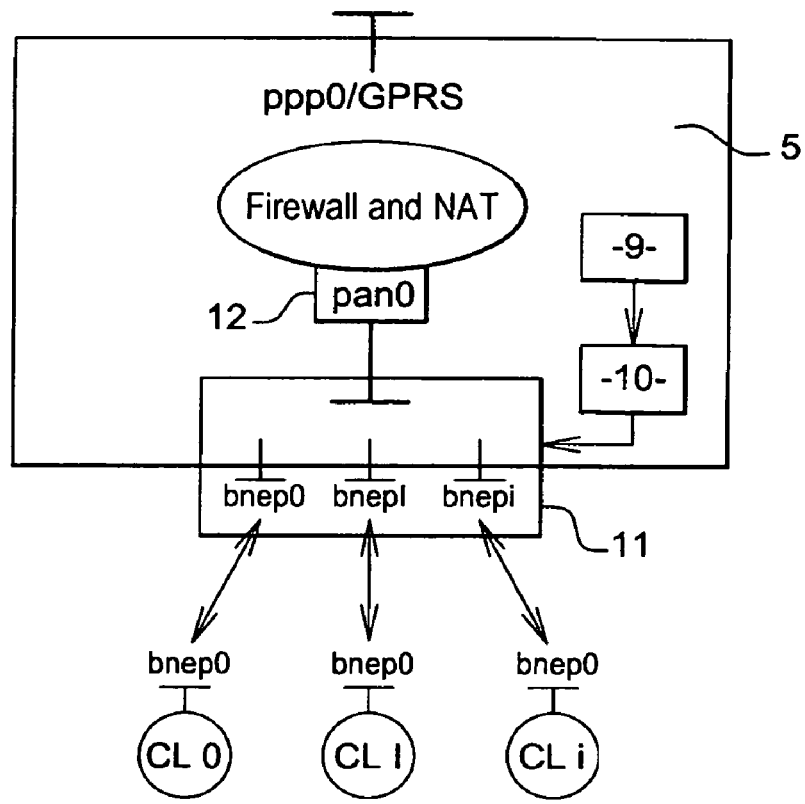
FIG. 3 is a block diagram of one particular embodiment of a system of the invention.

In FIG. 3, CL i are service access terminals, bnep0 is the virtual network interface to the service access terminals and to the system for connecting the local network to the mobile network to form the access point PAN, pan0 is the network interface of the system for connecting the local network to the mobile network on the PAN side, and ppp0/GPRS is the network interface of the system for connecting the local network to the mobile network on the GSM/GPRS side.

In the embodiment shown in FIG. 2, the service access terminals are connected via a Bluetooth™ short-range radio connection. A WiFi connection may be used subject to modifications that the person skilled in the art will know how to effect given the present description.

This corresponds to the situation in which the terminals TP_i are portable, each user having a portable terminal.

Figure 4:
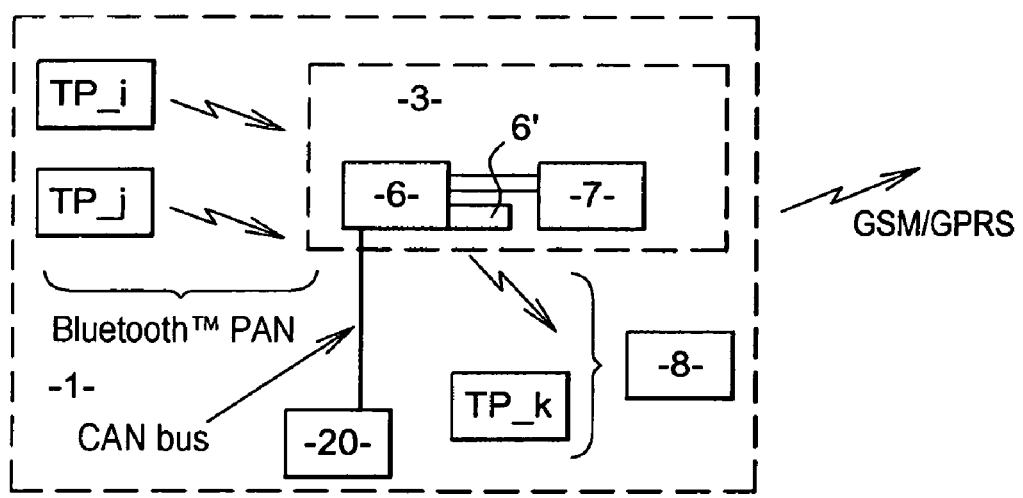
FIG. 4 is a block diagram of one particular embodiment of a system of the invention.

Other types of terminals may be connected to the network in another embodiment, shown in FIG. 4, in which components that also appear in FIG. 2 carry the same reference numbers and are not described further; these terminals are physically attached to the vehicle 1.

For example, a navigation system 20 is physically integrated into the dashboard of the motor vehicle 1. As a terminal of the local network 3, the navigation system 20 is connected in two ways to the system for connecting the local network to the mobile network:

by a Bluetooth™ radio interface or by an IrDa infrared interface (as in the case of portable terminals), by a cable connection. In this case, the system 5 for connecting the local network to the mobile network (not shown in FIG. 4) must provide a cable connection to the terminal 20, either a direct connection, preferably of the serial type, or a connection 21 via the third element (GSM/GPRS network connection system 6). In which case, the connection can then use other types of link, such as a Controller Area Network™ (CAN) bus. This cable connection solution is not described further in the context of the present embodiment.

2. The WISMO modem 7 can be any communications modem of this type available off the shelf. It requires no particular updating of its software version to provide the necessary communications functions associated with the implementation of the invention.

3. The GSM/GPRS network connection system 6 provides the connection between the modem 7 and the system 5 for connecting the local network to the mobile network, and is therefore transparent, merely transporting data between these two elements. This function is necessary when the system of the invention is implemented in the form of three separate elements.

This implementation of the functions in three separate elements (the system for connecting the local network to the mobile network, the modem, and the GSM/GPRS network connection system 6) must not be seen as obligatory. Only the functions executed therein that are described above are obligatory. The functions of the system for connecting the local network to the mobile network implemented by the first element (Ipaq) could be implemented in the GSM/GPRS network connection system 6.

This second embodiment, shown in FIG. 4, therefore has an architecture based on two elements: the GSM/GPRS network connection system 6, which provides the functions of the system for connecting the local network to the mobile network, and the GSM/GPRS modem, which provides the radio interface with the mobile network.

In this embodiment, there is a cable connection by means of a port to the CAN™ bus between an equipment integrated into the vehicle, which here is a navigation system, and the system for connecting the local network to the mobile network.

The invention claimed is:

1. A communications system for enabling connection of mobile communications terminals in a vehicle to a mobile communications network, wherein the communications system comprises:

a personal area network (PAN) local network comprising the mobile communications terminals in the vehicle, at least some of the mobile communications terminals having wireless connection means; and a communications network connection server comprising:

means for providing a first resource for connecting a requesting mobile communications terminal, from among the mobile communications terminals, to the mobile communications network, means for providing a second resource for interconnecting two of the mobile communications terminals of the PAN local network without accessing the mobile communications network, a wireless standard module (WISMO), a mobile network connection system adapted to be mounted in the vehicle and disposed between the WISMO and the communications network connection server for connecting the PAN local network to the mobile communications network, and SIM card management means comprising a SIM card emulator that includes electrical connections between the WISMO and the mobile network connection system, wherein a SIM card is installed in a mobile telephone connected to the mobile network connection system via a short-range communications connection to enable exchange of messages between the WISMO and the SIM card of the mobile telephone, and wherein the communications network connection server is configured to provide at least one interconnection between the mobile communications terminals via the second resource and providing a connection between at least one of the mobile communications terminals and the mobile communications network via the first resource.

2. The system according to claim 1, wherein the PAN local network is connected to the mobile communications network by a radio module providing an interface with the mobile communications network.

3. The system according to claim 2, wherein the communications network connection server forms a common connecting point between the mobile communications network and the PAN local network, the communications network connection server providing connections of any of the mobile communications terminals of the PAN local network to at least one application server accessed via the mobile communications network.

4. The system according to claim 3, wherein different contents are accessed simultaneously by the communications network connection server for connecting the PAN local network to the mobile communications network.

5. The system according to claim 4, wherein resources of the communications network connection server are used for connecting the PAN local network to the mobile communications network, the resources comprising means for providing the connections within the PAN local network without accessing the mobile communications network.

6. The system according to claim 1, wherein the PAN local network uses short-range communications defined by the Bluetooth Special Interest Group and includes PAN profile management means, a network access point (NAP) set to a multi-user mode, and means for configuring the NAP as a piconet master and the various mobile communications terminals as piconet slaves.

7. The system according to claim 1, wherein the communications network connection server is constructed on a platform executing a Linux operating system.

8. The system according to claim 1, wherein the communications network connection server is implemented in an electronic component.

9. The system according to claim 1, wherein the WISMO cooperates with means for producing and executing a standard AT Commands protocol.

10. The system according to claim 1, wherein the WISMO comprises said SIM card management means having a SIM card installed therein.

11. The system according to claim 1, wherein the mobile network connection system for providing the connection between the WISMO and the communications network connection server merely transports data between the WISMO and the communications network connection server.

12. A communications system for enabling connection of mobile communications terminals in a vehicle to a mobile communications network, wherein the communications system comprises:

a personal area network (PAN) local network comprising the mobile communications terminals in the vehicle, at least some of the mobile communications terminals having wireless connection means; and a communications network connection server comprising a processor, memory, and a short-range communications interface and forming a common connecting point between the mobile communications network and the PAN local network, the communications network connection server providing connections of at least one of the mobile communications terminals of the PAN local network to the mobile communications network, and providing the connections within the PAN local network without accessing the mobile communications network, a wireless standard module (WISMO), a mobile network connection system adapted to be mounted in the vehicle and disposed between the WISMO and the communications network connection server for connecting the PAN local network to the mobile communications network, and SIM card management means comprising a SIM card emulator that includes electrical connections between the WISMO and the mobile network connection system, wherein a SIM card is installed in a mobile telephone connected to the mobile network connection system via a short-range communications connection to enable exchange of messages between the WISMO and the SIM card of the mobile telephone, and wherein the communications network connection server is configured to provide at least one interconnection between the mobile communications terminals and providing a connection between at least one mobile communications terminal and the mobile communications network.

13. The system according to claim 12, wherein the PAN local network is connected to the mobile communications network by a radio module providing an interface with the mobile communications network.

14. The system according to claim 12, wherein different contents are accessed simultaneously by the communications network connection server for connecting the PAN local network to the mobile communications network.

15. The system according to claim 12, wherein the PAN local network includes PAN profile management means, a network access point (NAP) set to a multi-user mode, and means for configuring the NAP as a piconet master and the various mobile communications terminals as piconet slaves.

16. A communications method for enabling connection of mobile communications terminals in a vehicle to a mobile communications network, wherein the communications method comprises:

creating a personal area network (PAN) local network using the mobile communications terminals in the vehicle, at least one of the mobile communications terminals having wireless connection means;

providing connections, using a communications network connection server comprising a processor, memory, and a short-range communications interface, to enable connection of at least one of the mobile communications terminals of the PAN local network to the mobile communications network, the communications network connection server forming a common connecting point between the mobile communications network and the PAN local network; and providing connections within the PAN local network, using the communications network connection server, without accessing the mobile communications network, providing a connection between the PAN local network and the mobile communications network using a wireless standard module (WISMO) and a mobile network connection system adapted to be mounted in the vehicle and disposed between the WISMO and the communications network connection server, and emulating a SIM card using a SIM card management means that includes electrical connections between the WISMO and the mobile network connection system, wherein a SIM card is installed in a mobile telephone connected to the mobile network connection system via a short-range communications connection to enable exchange of messages between the WISMO and the SIM card of the mobile telephone, and wherein the communications network connection server provides at least one interconnection between the mobile communications terminals and providing a connection between at least one mobile communications terminal and the mobile communications network.

17. The method according to claim 16, wherein different contents are accessed simultaneously by the communications network connection server for connecting the PAN local network to the mobile communications network.

18. The method according to claim 16, wherein the PAN local network includes PAN profile management means and a network access point (NAP) set to a multi-user mode, and the method further comprises configuring the NAP as a piconet master and the various mobile communications terminals as piconet slaves.

19. A non-transitory computer-readable medium storing program code which when executed on a processor performs a communications method for enabling connection of mobile communications terminals in a vehicle to a mobile communications network, wherein the communications method comprises:

creating a personal area network (PAN) local network using the mobile communications terminals in the vehicle, at least one of the mobile communications terminals having wireless connection means;

providing connections, using a communications network connection server comprising a processor, memory, and a short-range communications interface, to enable connection of at least one of the mobile communications terminals of the PAN local network to the mobile communications network, the communications network connection server forming a common connecting point between the mobile communications network and the PAN local network; and providing connections within the PAN local network, using the communications network connection server, without accessing the mobile communications network, providing a connection between the PAN local network and the mobile communications network using a wireless standard module (WISMO) and a mobile network connection system adapted to be mounted in the vehicle and disposed between the WISMO and the communications network connection server, and emulating a SIM card using a SIM card management means that includes electrical connections between the WISMO and the mobile network connection system, wherein a SIM card is installed in a mobile telephone connected to the mobile network connection system via a short-range communications connection to enable exchange of messages between the WISMO and the SIM card of the mobile telephone, and wherein the communications network connection server provides at least one interconnection between the mobile communications terminals and providing a connection between at least one of the mobile communications terminals to the mobile communications network.

20. The non-transitory computer-readable medium according to claim 19, wherein different contents are accessed simultaneously by the communications network connection server for connecting the PAN local network to the mobile communications network.

21. The non-transitory computer-readable medium according to claim 19, wherein the PAN local network includes PAN profile management means and a network access point (NAP) set to a multi-user mode, and the method further comprises configuring the NAP as a piconet master and the various mobile communications terminals as piconet slaves.

* * * * *